United States Patent
Brunton et al.

(10) Patent No.: US 8,818,466 B2
(45) Date of Patent: Aug. 26, 2014

(54) SYSTEM AND METHOD FOR WIRELESS HOME COMMUNICATIONS

(75) Inventors: Jill Brunton, Overland Park, KS (US); Larry Harris, Lee's Summit, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 835 days.

(21) Appl. No.: 12/260,249

(22) Filed: Oct. 29, 2008

(65) Prior Publication Data

US 2010/0105445 A1    Apr. 29, 2010

(51) Int. Cl.
*H04M 1/00* (2006.01)

(52) U.S. Cl.
USPC .............. 455/575.2; 455/575.1; 455/90.3

(58) Field of Classification Search
USPC ........................................... 455/567
See application file for complete search history.

(56) References Cited

U.S. PATENT DOCUMENTS

| | | | |
|---|---|---|---|
| 5,809,142 A | 9/1998 | Hurta et al. | |
| 5,895,471 A | 4/1999 | King et al. | |
| 5,909,183 A * | 6/1999 | Borgstahl et al. | 340/825.22 |
| 6,435,690 B1 | 8/2002 | Till | |
| 6,954,659 B2 | 10/2005 | Tushinsky et al. | |
| 7,130,664 B1 | 10/2006 | Williams | |
| 7,623,030 B1 | 11/2009 | Popescu | |
| 2003/0078081 A1* | 4/2003 | Schmier | 455/567 |
| 2004/0058706 A1* | 3/2004 | Williamson et al. | 455/557 |
| 2004/0209654 A1 | 10/2004 | Cheung et al. | |
| 2004/0224670 A1 | 11/2004 | Hull et al. | |
| 2005/0096095 A1* | 5/2005 | Benco et al. | 455/567 |
| 2005/0172154 A1 | 8/2005 | Short et al. | |
| 2005/0221792 A1 | 10/2005 | Mattisson | |
| 2005/0266891 A1 | 12/2005 | Mullen | |
| 2006/0003700 A1 | 1/2006 | Yasuda | |
| 2006/0293063 A1 | 12/2006 | Corrion | |
| 2008/0013601 A1 | 1/2008 | Lind et al. | |
| 2008/0125042 A1 | 5/2008 | Kim | |
| 2008/0146890 A1* | 6/2008 | LeBoeuf et al. | 600/300 |
| 2008/0186960 A1 | 8/2008 | Kocheisen et al. | |
| 2009/0082071 A1* | 3/2009 | Hicks, III | 455/570 |
| 2009/0286514 A1* | 11/2009 | Lichorowic et al. | 455/412.2 |
| 2009/0325599 A1 | 12/2009 | Vuori | |

FOREIGN PATENT DOCUMENTS

WO    WO 2004/100580 A1    11/2004

OTHER PUBLICATIONS

Non-Final Office Action date mailed Jan. 22, 2010 in U.S. Appl. No. 11/807,626.
Response to Non-Final Office Action filed Feb. 1, 2010 in U.S. Appl. No. 11/807,626.
Non-Final Office Action date mailed Apr. 22, 2010 in U.S. Appl. No. 11/906,100.
Final Office Action date mailed Apr. 23, 2010 in U.S. Appl. No. 11/807,626.

(Continued)

*Primary Examiner* — Charles Appiah
*Assistant Examiner* — Randy Peaches
(74) *Attorney, Agent, or Firm* — Swanson & Bratschun, L.L.C.

(57) ABSTRACT

A system and method for communicating home information. An earpiece is linked with a router for wireless communications. The earpiece is alerted of incoming communications through a wire telephone in communication with the router. The earpiece is connected to the wire telephone for enabling voice communications in response to user input to accept a call. A status of one or more appliances in communication with the router is received.

20 Claims, 3 Drawing Sheets

(56) References Cited

OTHER PUBLICATIONS

Response to Final Office Action filed Jul. 6, 2010 in U.S. Appl. No. 11/807,626.
Response to Non-Final Office Action filed Jul. 7, 2010 in U.S. Appl. No. 11/906,100.
Notice of Allowance date mailed Jul. 19, 2010 in U.S. Appl. No. 11/807,626.
RCE filed Aug. 9, 2010 for U.S. Appl. No. 11/807,626.
Non-Final Office Action date mailed Aug. 12, 2010 for U.S. Appl. No. 11/897,333.
Final Office Action date mailed Sep. 7, 2010 for U.S. Appl. No. 11/906,100.
Bill Ray, The Register; http://www.theregister.co.uk/2007/05/07/how_do_you_carry_a_phone/print.html; May 8, 2007 (pp. 1 of 2).
Jason Chen, Hands on With BlueQ Bluetooth They Work as Advertised, About Gizmodo, http:/gizmodo.com/gadgets/review/hands+on-with-blueq-bluetooth-wristbands-verdict-the; May 21, 2007 (1 of 9 pages).
U.S. Appl. No. 11/807,626, filed May 30, 2007, Sweeney et al.
U.S. Appl. No. 11/906,100, filed Sep. 28, 2007, Sweeney et al.

\* cited by examiner

SYSTEM AND METHOD FOR WIRELESS HOME COMMUNICATIONS

BACKGROUND OF THE INVENTION

The usage of communications and communications related services has grown nearly exponentially in recent years. This growth is fostered by enhanced standards, protocols, networks, and devices. Many wireless technologies have drastically changed how users communicate daily. During that same time period, the traditional home phone lines and related technologies have not changed significantly. As a result, most users still communicate through a home phone line or home phone using a traditional phone, base station or handset.

BRIEF SUMMARY OF THE INVENTION

One embodiment provides a system and method for communicating home information. An earpiece may be linked with a router for wireless communications. The earpiece may be alerted of incoming communications through a wire telephone in communication with the router. The earpiece may be connected to the wire telephone for enabling voice communications in response to user input to accept a call. A status of one or more appliances in communication with the router is received.

Another embodiment provides a system for wireless communications. The system may include a router operable to coordinate communications with an earpiece. The router may be operable to communicate with a wired telephone to enable voice communications through the earpiece. The router may be operable to communicate with the earpiece and one or more appliances through one or more wireless connections through one or more wireless connections. The system may also include an earpiece operable to alert a user of incoming communications through a wired telephone in communication with the router. The earpiece may be further operable to receive voice communications through the one or more wireless connections in response to receiving user input to initiate a communication through the wired telephone. The earpiece may be further operable to play an alert to the user from the one or more appliances in communication with the router in response to the router receiving a status of the one or more appliances.

Yet another embodiment provides a router for home communications. The router may include a processor for executing a set of instructions and a memory in communication with the processor operable to execute a set of instructions. The set of instructions may be executed to link an earpiece with the router for wireless communications, alert the earpiece of incoming communications through a wired telephone in communication with the router, connect the earpiece to the wired telephone for enabling voice communications in response to user input to accept a call, receive an alert indicating a status of one or more appliances in communication with the router, and communicate a command received from the earpiece to the one or more appliances to implement an action through the router.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Illustrative embodiments provide a system and method for wireless home communications. In one embodiment, a user may communicate through a telephone or telephone connection utilizing a wireless earpiece. The wireless earpiece may communicate with a router to receive any number of alerts. The wireless earpiece is a wireless communications device configured to wirelessly communicate signals, messages, and voice communications with the router. The router is a network device configured to route communications from a telephone or telephone connection, as well as any number of appliances to the wireless earpiece.

The appliances are devices that provide services and functionality within a home, business or organization. The appliances may include an oven, washer and dryer, microwave, set-top box, garage, baby monitor, alarm system, television, sprinkler system, or other devices suitable for utilization by a user within the home. The appliances may include any number of sensors, timers, and computing devices that indicate a state or status of the respective appliance. The status information, such as a unbalanced load for a washer may be communicated to the user through the wireless earpiece. The term "home" is used generically to refer to a residence, business, organization, or other location in which voice communications and appliances may be utilized by a user. Any number of alerts may be routed to the wireless earpiece based on actions, events, parameters, thresholds, pre-conditions, or other happenings detected by the router.

In one embodiment, the wireless earpiece may receive a message from the router that indicates in a whisper that a call is incoming. In another embodiment, the router may send a wireless signal indicating that a threshold noise level has been exceeded by the baby monitor indicating a child has awoke from sleep. The wireless earpiece may use a whisper indicating the type of alert or an action associated with an alert. However, the wireless earpiece may utilize any number of tones, signals, chimes, songs, note sequences or prompts suitable for alerting the user of an incoming call, status of an appliance, or other message the router is programmed or configured to communicate to the wireless earpiece. The wireless earpiece allows the user to retain freedom of movement while still receiving communications, information, and status updates from one or more wired telephones and appliances.

Figure 1:
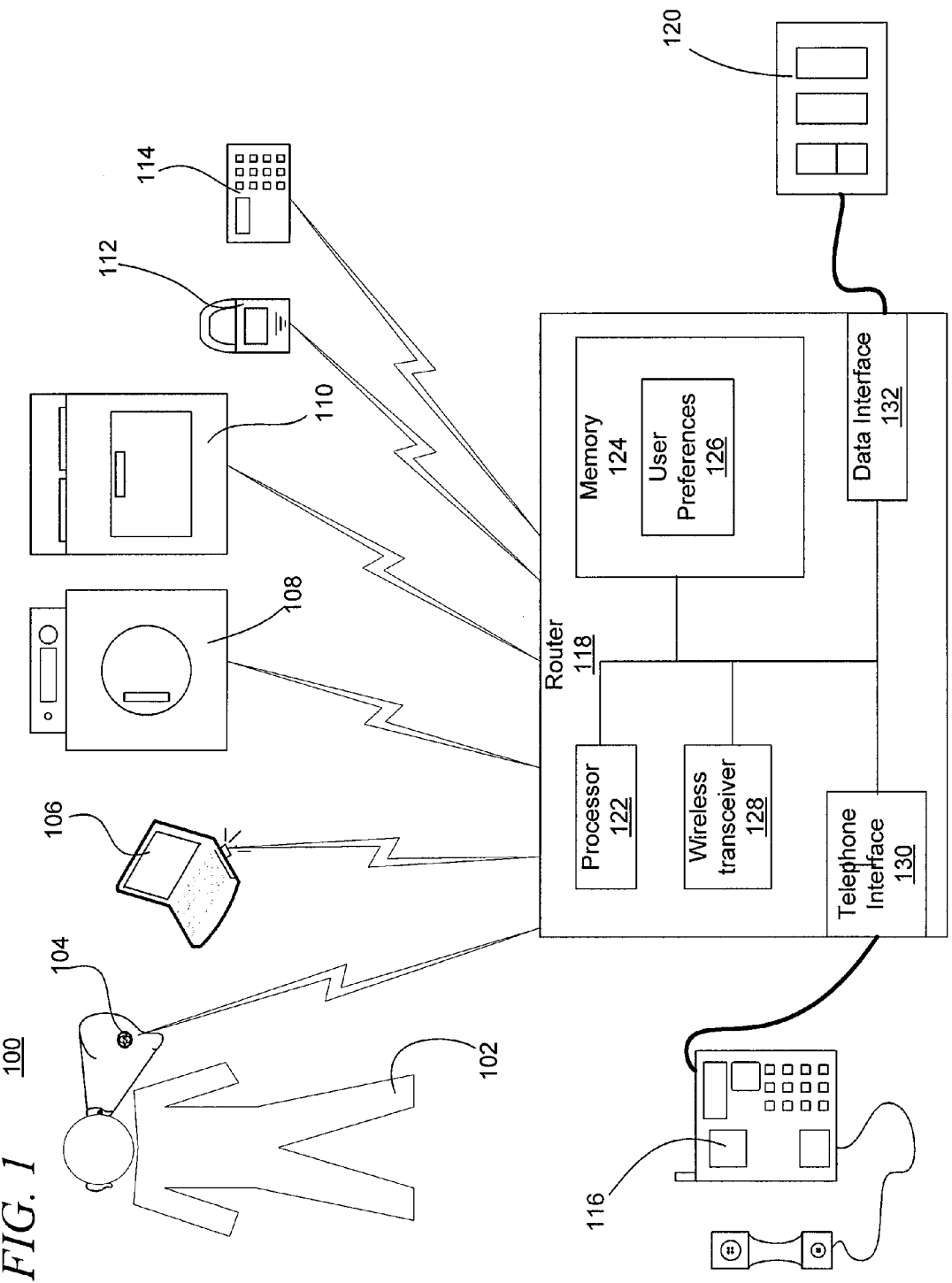
FIG. 1 is a pictorial representation of a wireless environment in accordance with an illustrative embodiment.

FIG. 1 is a pictorial representation of a wireless environment in accordance with an illustrative embodiment. The wireless environment 100 is one embodiment of a setting, building, or other location in which the communication devices, computing devices, and appliances may communicate utilizing wireless or wired connection signals, standards, and protocols. The wireless environment 100 may include any number of devices, elements, or other components. In one embodiment, the wireless environment 100 may include a user 102, a wireless earpiece 104, a laptop 106, a washer 108, an oven 110, a baby monitor 112, an alarm system 114, a telephone 116, a router 118, and a communications management system 120. The router may further include a processor 122, a memory 124, user preferences 126, a wireless transceiver 128, a telephone interface 130, and a data interface 132.

In one embodiment, the router 118 may manage and control alert signals and communications sent to the wireless earpiece 104. The router 118 may include various elements for controlling processing and routing communications to the devices within the wireless environment 100. The different devices of the wireless environment 100 may be configured to communicate with one another. For example, the user may be required to enter a linking or association mode to link the router 118 with the wireless earpiece. The different devices of the wireless environment 100 may communicate through a single channel or frequency or through multiple channels in order to ensure that communications occur without interference.

The processor 122 is circuitry or logic enabled to control execution of a set of instructions. The processor 122 may be a microprocessor, digital signal processor, central processing unit, or other device suitable for controlling an electronic device including one or more hardware and software elements, executing software, instructions, programs, and applications, converting and processing signals and information, and performing other related tasks. The processor 122 may be a single chip or integrated with other computing or communications elements.

The memory 124 is a hardware element, device, or recording media configured to store data for subsequent retrieval or access at a later time. The memory 124 may be static or dynamic memory. The memory 124 may include a hard disk, random access memory, cache, removable media drive, mass storage, or configuration suitable as storage for data, instructions, and information. In one embodiment, the memory 124 and processor 122 may be integrated. The memory may use any type of volatile or non-volatile storage techniques and mediums.

In one embodiment, the various features, processes, and steps performed by the router 118 may be stored within modules in the memory 124 for execution by the processor 122. Similarly, the router 118 may include communications logic operable to control communications with the wireless earpiece 104, laptop 106, washer 108, oven 110, baby monitor 112, and alarm system 114, as well as the telephone 116 and communications management system 120. The communications logic may be hardware, software, or a combination thereof. The router 118 may include any number of other hardware and software elements not explicitly described herein which may include transceivers, busses, ports, cards, antennas, motherboards, digital logic, analog circuit, and other computing and communications hardware and software.

In one embodiment, the user preferences 126 are the settings, configurations, and parameters that control the operation of the router 118 based on default settings and input from the user 102. In one embodiment, the user preferences 126 may specify the type of alert that is communicated to the wireless earpiece 104. For example, the user preferences 126 may sort text messages that are converted to voice whispers by a text-to-voice conversion program. As a result, the user 102 may receive an automated message specifying when the oven 110 is preheated, such as "oven preheated."

In another embodiment, the user preferences 126 may store custom messages that the user 102 may enter in his or her own words or text. For example, the user 102 may utilize the laptop 106 to record a voice message if the alarm system detects one or more doors or windows within the home are opened. The user preferences 126 may store a message, such as "the game room window has been opened," or "the backdoor remains opened after 10 minutes". Any number of custom alerts may be played to the user 102 utilizing a text-to-speech conversion program or a pre-recorded message.

The wireless transceiver 128 is a communications interface configured to communicate with the wireless earpiece 104 and the appliances which may include the laptop 106, the washer 108, the oven 110, the baby monitor 112, and the alarm system 114. The appliances shown in the wireless environment 100 are given for illustration purposes only. The number and type of appliances may vary based on the settings of the user 102 and the capability of the individual devices. In one embodiment, the appliances may include a similar wireless interface, transceiver, card, port, or other device configured to communicate with the wireless transceiver 128. In another embodiment, the wireless transceiver 128 may be configured to receive powerline, Ethernet, or data communications from the appliances, and as a result may only communicate wirelessly with the wireless earpiece 104. Various appliances may be configured to communicate information indicating a fire, break-in or other information to one or more other systems, organizations, or other receiving parties. The information may also be simultaneously communicated to the wireless earpiece 104 as an alert to the user 102.

The wireless transceiver 128 may utilize any number of standards or protocols. In one embodiment, the wireless transceiver 128 may utilize a communications signal, such as Bluetooth®. However, the wireless transceiver 128 may utilize any number of communications signals, standards, and protocols suitable for wireless communications, including, but not limited to, WiFi, WiMAX, CDMA, GSM, GSMR or other similar protocols. The wireless transceiver 128 may similarly utilize a digital, analog, packet, or other communications signal, type or standard. The user 102 may utilize the wireless earpiece 104 within a range of the router 118. For example, the user 102 may perform any number of actions, tasks or chores while wearing the earpiece 102 with convenient communications received through the router 118.

The telephone interface 130 is a communications interface configured to receive forwarded communications from the telephone 116 or a wired connection in communication with the telephone for transmission to the wireless earpiece 104. In one embodiment, the telephone interface 130 may convert the wired telephone signals received from the telephone 116 for wireless communications to the wireless earpiece 104 from the wireless transceiver 128. For example, the telephone interface 130 may receive an analog signal from the telephone 116 that may be converted to a Bluetooth signal transmitted to the wireless earpiece 104. The telephone interface 130 may be configured to communicate with any number of telephone types, systems, and standards. In one embodiment, the telephone 116 is a plain old telephone service (POTS) telephone. In another embodiment, the telephone 116 is a digital telephone, voice over Internet protocol (VoIP) telephone, or other telephonic device, system or application suitable for voice communications.

In one embodiment, the router 118 may also include the data interface 132. The data interface 132 is an interface for communicating through a data connection or a data device. In one embodiment, the data interface 132 may communicate with a digital subscriber line (DSL), cable, satellite, WiMAX, fiber optic, Ethernet, or other data connection. The data interface 132 may communicate directly with the data connection or may do so through a client device, such as a modem, other router, personal computer server, or other device.

The data interface 132 may communicate with the communications management system 120. In one embodiment, the communications management system 120 may store settings, parameters, preferences, or other information that are utilized to configure, program, operate or update the router 118 and the corresponding user preferences 126. For example, the user 102 may utilize a communications or computing device linked to a communications network to update settings available through the communications management system 120. For example, the communications management system 120 may be operated by a communications service provider that controls and manages a web portal accessible to the user 102.

In one embodiment, the user 102 may access the web portal to perform any number of actions, tasks, or associations. For example, the portal of the communications management system 120 may be utilized to associate a new appliance with the router. In addition, the user 102 may set alerts, thresholds, conditions or criteria for the alerts, and message types utilized for the alerts. In another embodiment, the same type of configurations may be performed utilizing an interactive voice response (IVR) system available through the communications management system 128. For example, the user 102 may access the telephone 116 to set any number of preferences, settings, and parameters for the router 118 through voice menus, voice commands, prompts, button selections, or other selections available through the IVR or communications management system 120. The user input, updates, settings or commands may be then sent to the router 118 through the telephone 116 or through the communications management system 120. A host, remote, or local application may also be utilized to associate one or more appliances with the router 118.

The appliances of the wireless environment 100 may include integrated communications equipment, devices, cards, ports, antennas, or other similar components for communicating with the router 118 through the wireless transceiver 128. In another embodiment, the appliances may be retrofitted for communications with the router 118.

Figure 2:
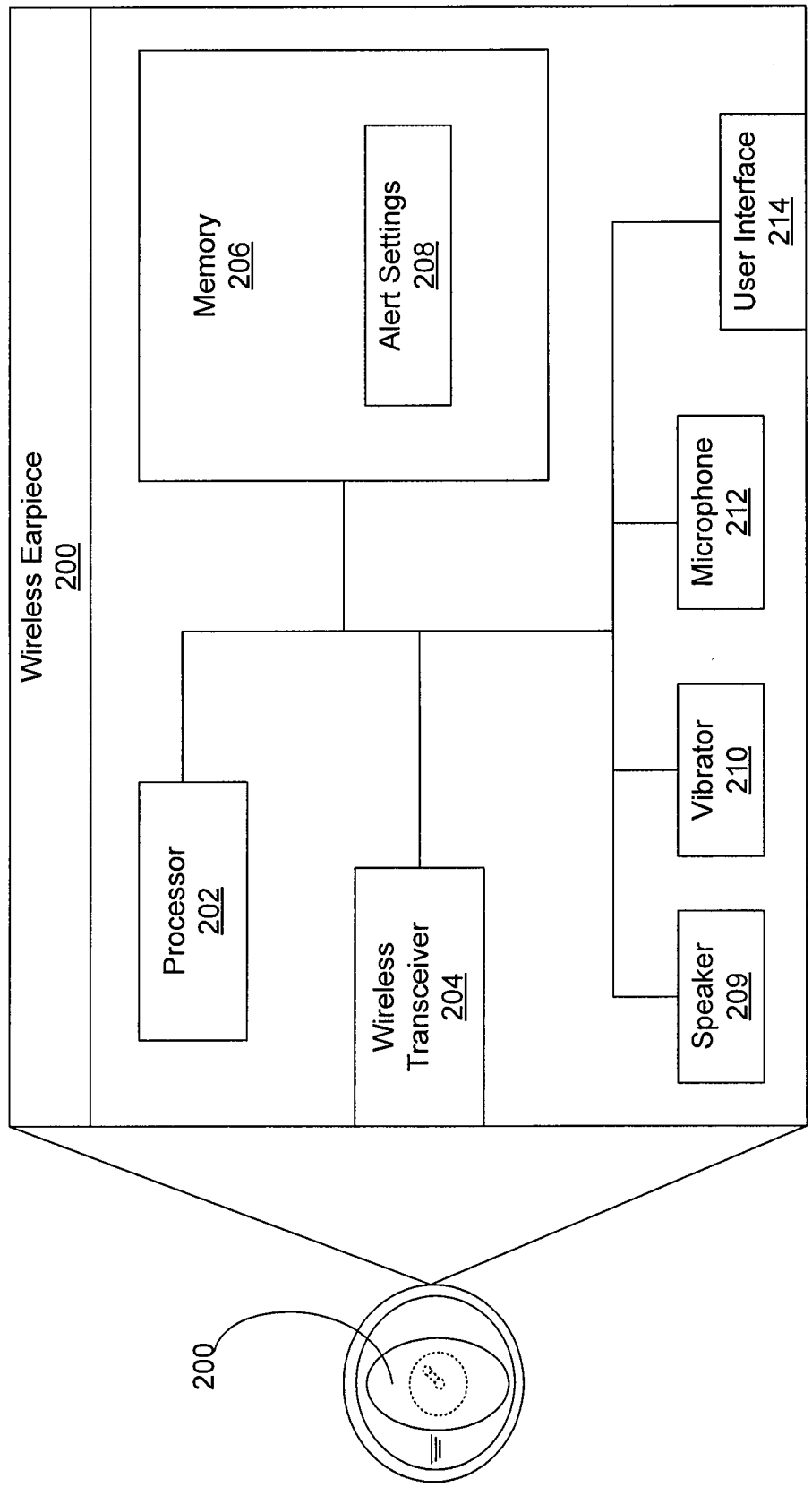
FIG. 2 is a block diagram of a wireless earpiece in accordance with an illustrative embodiment.

FIG. 2 is a block diagram of a wireless earpiece in accordance with an illustrative embodiment. The wireless earpiece 200 is a particular implementation of the wireless earpiece 104 of FIG. 1. The wireless earpiece 200 may include various internal components which may include a processor 202, wireless transceiver 204, memory 206, alert settings 208, a speaker 209, a vibrator 210, a microphone 212, and a user interface 214. The wireless earpiece 200 may be an in-ear plug, an over-ear headset, an around-ear earpiece or other similar device. In one embodiment, the wireless earpiece 200 may be configured for dual-communication with a wireless device, such as a cell phone, as well as the router. For example, once the wireless earpiece 200 is detected of being within a range of the router, the wireless earpiece 200 may receive communications through the router only or through both the router and wireless earpiece 200.

The processor 202 may be a processing unit used to process signals received from the router through the wireless transceiver 204. The processor 202 may also be logical components for implementing the features of the wireless earpiece 200. The processor 202 may control the functional operation of the various elements of the wireless earpiece 200. For example, the processor may execute a set of instructions to implement the features and functionality of the wireless earpiece 200. The wireless earpiece 200 may include other hardware and software elements used by communication devices and data processing systems not explicitly described herein including, but not limited to, those described for the router 118 of FIG. 1. The router in communication with the wireless earpiece 200 may include added software or hardware for controlling, interfacing, or otherwise communicating with the wireless earpiece 200 to perform any number of communication implementations and features. In another embodiment, the processor 202 may be replaced by logic, circuits, or modules configured to perform the communications features as herein described.

The wireless transceiver 204 is the transmitter and receiver that establishes the wireless connection between the wireless earpiece 200 and the router. For example, the wireless transceiver 204 may include an antenna and Bluetooth circuitry for communicating with the router. Alternatively, the wireless transceiver 204 may communicate with the router using any number of radio frequencies or wireless control signals for sending voice communications and/or control signals over the wireless connection. The wireless transceiver 204 may send alerts to the processor so that the appropriate alert may be activated through the vibrator 210 or speaker 209. In one embodiment, the incoming data, message or signal may require a specific alert be played. The alert settings 208 may specify the type of alert and how it is played or activated through the wireless earpiece 200.

The wireless transceiver 204 may also allow the wireless earpiece 200 to be integrated with a personal accessory, such as a headset, headband, headband, sunglasses, or other audio device. The wireless transceiver 204 may include the contacts, wiring, software, and other elements that allow the wireless earpiece 200 and another electronic device to communicate and/or be integrated functionally or aesthetically.

The memory 206 may be an electronic storage medium for saving instructions for execution by the processor 202. For example, the instructions stored in the memory 206 may detail logic, programs, or code that dictate the functionality of the wireless earpiece 200 and how each of the different components interacts with one another and with the user. The alert settings 208 may establish preferences, parameters or settings configured by the wireless user for operation of the wireless earpiece 200. For example, the alert settings 208 may establish messages whispered to the user based on caller identification information and status of associated appliances.

Instructions or software within the memory 206 may also detail how the wireless earpiece 200 interacts when integrated or connected to another electronic device or personal accessory. In one embodiment, the alert settings 208 may be configured to activate the vibrator 210 when the wireless earpiece 200 is embedded within a hair clip. The alert settings 208 and alert settings 208 may also be configured to play an alert through the speaker, headphones, and/or display when the wireless earpiece 200 is attached or integrated with an mp3 player. The alert settings 208 may store additional data and user settings for when the wireless earpiece 200 is attached to another device, electronic or otherwise.

In one embodiment, the alert settings 208 may establish how and when the user is alerted of incoming communication received by the router. The alert settings 200 may also include thresholds, conditions, and parameters for generating an alert. The threshold is the state or condition of the appliances or wired telephone in communication with the wireless earpiece. For example, if an oven timer is within one minute of going off an alert is sent to the wireless earpiece 200 in the form of a chime. The alert settings 208 may include any number of default and custom messages, ring tones, sounds, prompts, chirps, and other audio indicators that may be used as an alert. The alert settings 208 may also specify a default volume level for the wireless earpiece 200. The alert settings 208 may indicate whether the speaker 209, vibrator 210 is used as an alert to indicate a voice communication is detected by the router. The alert settings 208 may also control whether ongoing voice communications are altogether interrupted, mixed, or overlaid to play an alert of incoming communications to a router.

As previously discussed, different callers or alerts may be associated with the speaker 209, vibrator 210 and microphone 212. The alert settings 208 may also control the default settings for the speaker 209, vibrator 210, and microphone 212. For example, the speaker 209 may be set to gradually increase in volume each time the router detects that the telephone has rung and the wireless earpiece 200 is informed of the incoming call through the wireless transceiver 204. In another example, the vibrator 210 may vibrate once or in a series to indicate to the user that communication is incoming to the router. The alert settings 208 and alert settings 208 may be synchronized or downloaded from the router. For example, the alert settings 208 may ensure that ring tones or other alerts available on the router are downloaded to the memory 206 of the wireless earpiece 200.

The user interface 214 is a interface for receiving user input. In one embodiment, the user interface 214 may be a one or more buttons, volume keys, dials, or other interface elements. The user interface 214 may also be utilized in conjunction with voice commands to make outgoing calls or send commands to the one or more appliances. In one embodiment, the user may send a command programming an oven timer. The wireless earpiece 200 may also be utilized to restart the dryer. The wireless earpiece 200 may be utilized to turn on or off appliances or implement other actions. For example, the user may give a voice command to increase a timer for a dryer. The functionality, instructions, and preferences of the wireless earpiece 200 may be verbally or manually selected by a user using the speaker 209, user interface 214 or may be received from the router by the wireless transceiver 204. The user interface 214 may also be able to project text, colors, and images for display to the user. For example, if the wireless earpiece 200 is embedded in a pair of glasses, the alert settings 208 may establish that the microphone 212 flashes a message or visual alert that is only discernible to the wearer of the glasses.

The wireless earpiece 200 may be shaped or otherwise configured to be embedded, inserted, or connected to another electronic device or personal accessory. As a result, the wireless earpiece 200 may be a stand-alone card, or other device that may be integrated with different devices and accessories as herein described. In one embodiment, the wireless earpiece 200 is specially shaped to snap into a piece of jewelry. In another embodiment, the wireless earpiece 200 is specially shaped to be slidably mounted or inserted into personal accessories, such as a pair of sunglasses or a music player. The wireless earpiece 200 may include a release or locking mechanism for ensuring that the wireless earpiece 200 is not accidentally separated from the personal accessory. In one embodiment, the wireless earpiece may be worn as an on-ear headset or may be configured in any number of ergonomic or wearer friendly configurations.

Figure 3:
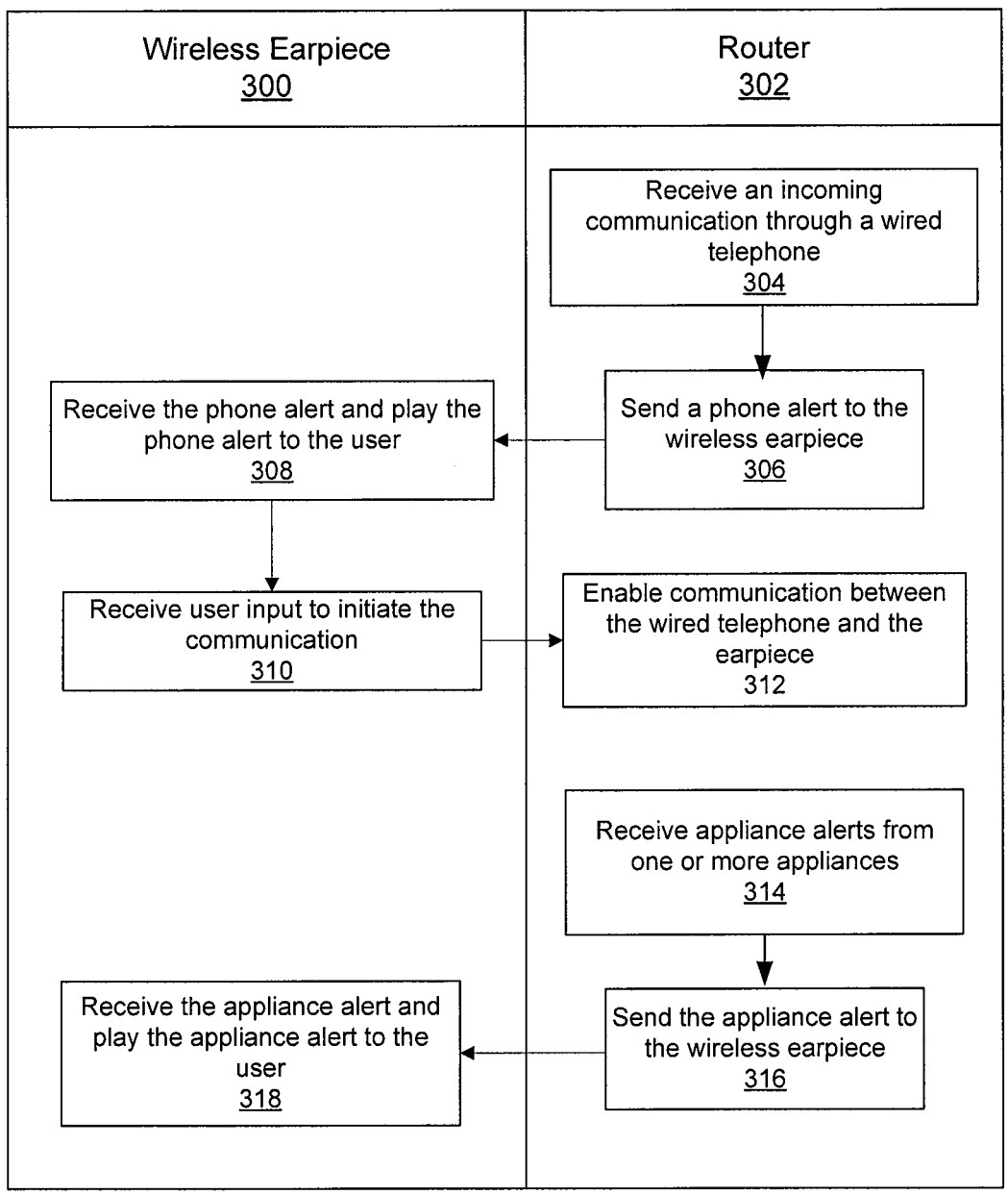
FIG. 3 is a flowchart of a process for a wireless earpiece and router to communicate in accordance with an illustrative embodiment.

FIG. 3 is a flowchart of a process for a wireless earpiece and router to communicate in accordance with an illustrative embodiment. The process of FIG. 3 illustrates one embodiment of a communications signals and interactions that may occur between a wireless earpiece and a router. The process may begin with the router receiving an incoming communications through a wired telephone (step 304). The incoming communication may be an alert, message or determination by the router that a call or communication is being initiated or requested with the wired telephone. The wired telephone may be a POTS, VoIP, or digital phone, as previously described.

Next, the router sends a phone alert to the wireless earpiece (step 306). The alert may be in the form of a message, packet, signal, or other suitable communications. In one embodiment, the router may utilize a database or memory to determine the phone alert to be utilized. For example, the phone alert may depend on caller identification information, time of the call, or other preconfigured settings or selections.

Next, the wireless earpiece receives the phone alert and plays the phone alert to the user (step 308). In one embodiment, the phone alert may be a whisper indicating that a call is incoming, caller identification information, or other information that the user may find helpful. The phone alert may have been previously recorded in the user's own voice or words, or may be a default message converted by the earpiece 300 or the wireless router using a text-to-voice program.

Next, the wireless earpiece receives user input to initiate the communications (step 310). In one embodiment, the user input may be a tactile selection, voice command, mechanical feedback, or other form of user selection. For example, the user may select a button of the wireless earpiece to allow voice communications to occur through the wireless earpiece. In another embodiment, the user input may be a voice command to answer call(s). Next, the router enables communication between the wired telephone and the wireless earpiece (step 312). As a result, the voice communication may occur between the wireless earpiece and the router utilizing wireless signals. The router converts the wireless signals for transmission through the wired telephone or the telephone connection associated with the wired telephone. The wireless earpiece may also be utilized to make outgoing calls using user input or voice commands.

At any time, including during a voice communication, the router may receive appliance alerts from one or more appliances (step 314). For example, the router may receive a message indicating that the washer has finished a current load or cycle. Similarly, the router may receive indication if a device has met or exceeded specified thresholds or criteria. For example, the user may have set preferences indicating that if one of the televisions remains activated for more than three hours the router receives an appliance alert. The conditions and thresholds may be stored within the individual appliance or by the router for managing when alerts are sent to the wireless earpiece. The router and appliances may communicate constantly with the router utilizing logic to determine when the user is sent an alert based on the status or condition of the appliance.

Next, the router sends the appliance alert to the wireless earpiece (step 316). The wireless earpiece receives the appliance alert and plays the appliance alert to the user (step 318). As previously described, the appliance alert may briefly interrupt a voice communication or play the appliance alert over top of the voice communication to inform the user of the status of the appliance.

The wireless earpiece may receive user input or commands that are communicated to the router for distribution to one or more appliances. For example, the user may provide a voice command to power down electronic devices, restart a dryer, close the garage, change a channel of the television, or activate music through a stereo or baby monitor.

The illustrative embodiments may allow a user to more easily answer and make phone calls through a wired telephone. The wireless earpiece may be unobtrusively worn or mounted in, on or around the user's ear to allow free movement and multi-tasking throughout the day. For example, a female user may insert the earpiece within her ear to prevent the earpiece from interfering with hair, jewelry or other accessories. Similarly, the user may receive updates and status information regarding communicating appliances.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for communicating home information, the method comprising:
   linking an earpiece with a router for wireless communications;
   receiving user preferences for sending communications between a wired telephone or one or more appliances and the earpiece, the user preferences are capable of specifying (i) types of alerts sent to the earpiece from the wired telephone and the one or more appliances including at least audible alerts, user recorded messages, and text-to-voice messages, and (ii) conditions for communicating the alerts;
   downloading at least some of the user preferences from the router to the earpiece;
   alerting the earpiece of incoming communications through the wired telephone in communication with the router according to the user preferences;
   connecting the earpiece to the wired telephone for enabling voice communications in response to user input to accept a call; and
   sending one of the alerts indicating a status of one or more appliances in communication with the router to the earpiece according to the user preferences.

2. The method according to claim 1, further comprising:
   whispering information regarding the incoming communications or the one of the alerts to a user wearing the earpiece in response to receiving one of the alerts.

3. The method according to claim 2, wherein the information includes caller identification information.

4. The method according to claim 2, wherein the information whispered to the user is one of the user recorded messages.

5. The method according to claim 2, wherein the information is one of the text-to-voice messages converted to voice by the router.

6. The method according to claim 1, wherein the earpiece is externally shaped and electronically operable to be integrated with another electronic device.

7. The method according to claim 6, further comprising:
   configuring the user preferences through a web portal in communication with the router.

8. The method according to claim 6, configuring the user preferences through an interactive voice response system in communication with the router.

9. The method according to claim 1, wherein the user input is a selection of an interface of the earpiece operable to enable voice communications by a user with a calling party through the earpiece.

10. The method according to claim 1, wherein the user preferences are enabled to interrupt, be mixed with, or overlaid with audio content being communicated to the user through the earpiece.

11. The method according to claim 1, wherein the status is played over the voice communications.

12. The method according to claim 1, further comprising:
    sending a command to the one or more appliances to perform an action based on a user.

13. A system for wireless communications, the system comprising:
    a router operable to coordinate communications with a earpiece, the router being operable to communicate with a wired telephone to enable voice communications through the earpiece, the router being operable to communicate with the earpiece and one or more appliances through one or more wireless connections, the router communicates with the wired telephone and the one or more appliances according to user preferences, the user preferences are capable of specifying (i) types of alerts sent to the earpiece from the wired telephone and the one or more appliances the types of alerts including at least audible alerts, user recorded messages, and text-to-voice messages, and (ii) conditions for communicating the alerts, wherein the router downloads at least some of the user preferences to the earpiece; and
    the earpiece operable to alert a user of incoming communications through a wired telephone in communication with the router according to the user preferences, the earpiece is further operable to receive voice communications through the one or more wireless connections in response to receiving user input to initiate a communication through the wired telephone, the earpiece is further operable to play one of the alerts to a user from the one or more appliances in communication with the router in response to the router receiving a status of the one or more appliances and the user preferences.

14. The system of claim 13, wherein the earpiece further comprises:
    a wireless transceiver operable to link the earpiece with the router through the one or more wireless connections;
    a speaker in communication with the wireless transceiver, the speaker operable to play the voice communications and the alert to the user;
    a microphone in communication with the wireless transceiver, the microphone operable to receive voice input and voice commands, the voice input is for the voice communications and the voice commands instruct the one or more appliances to perform an action; and
    an interface in communication with the wireless transceiver, the interface operable to initiate the voice communications.

15. The system of claim 13, wherein the earpiece is externally shaped and electronically operable to be integrated with another electronic device.

16. The system of claim 13, wherein the alerts are capable of interrupting, being mixed with, or overlaying audio content being communicated to the user through the earpiece according to the user preferences.

17. A router for home communications, the router comprising:
    a processor for executing a set of instructions;
    a memory in communication with the processor, the memory operable to execute the set of instructions to:
    link an earpiece with the router for wireless communications;
    receive user preferences for sending communications between a wired telephone or one or more appliances and the earpiece, the user preferences are capable of specifying types of alerts sent to the earpiece from the wired telephone and the one or more appliances including at least audible alerts, user recorded messages, and text-to-voice messages, and conditions for communicating alerts;

download at least some of the user preferences from the router to the earpiece;

alert the earpiece of incoming communications through the wired telephone in communication with the router according to user preferences;

connect the earpiece to the wired telephone for enabling voice communications in response to user input to accept a call;

sending one of the alerts indicating a status of one or more appliances in communication with the router to the earpiece according to user preferences;

and communicate a command received from the earpiece through the router to the one or more appliances to implement an action.

18. The router according to claim 17, wherein the earpiece is externally shaped and electronically operable to be integrated with another electronic device.

19. The router according to claim 17, wherein the set of instructions further:

associates voice input from the user as the alert, and wherein the alert is whispered to a user through the earpiece.

20. The router according to claim 17, wherein the voice communications or audio content played through the earpiece are capable of being interrupted, mixed with, or overlaid with the alerts being communicated to the user through the earpiece according to the user preferences.

* * * * *